United States Patent Office

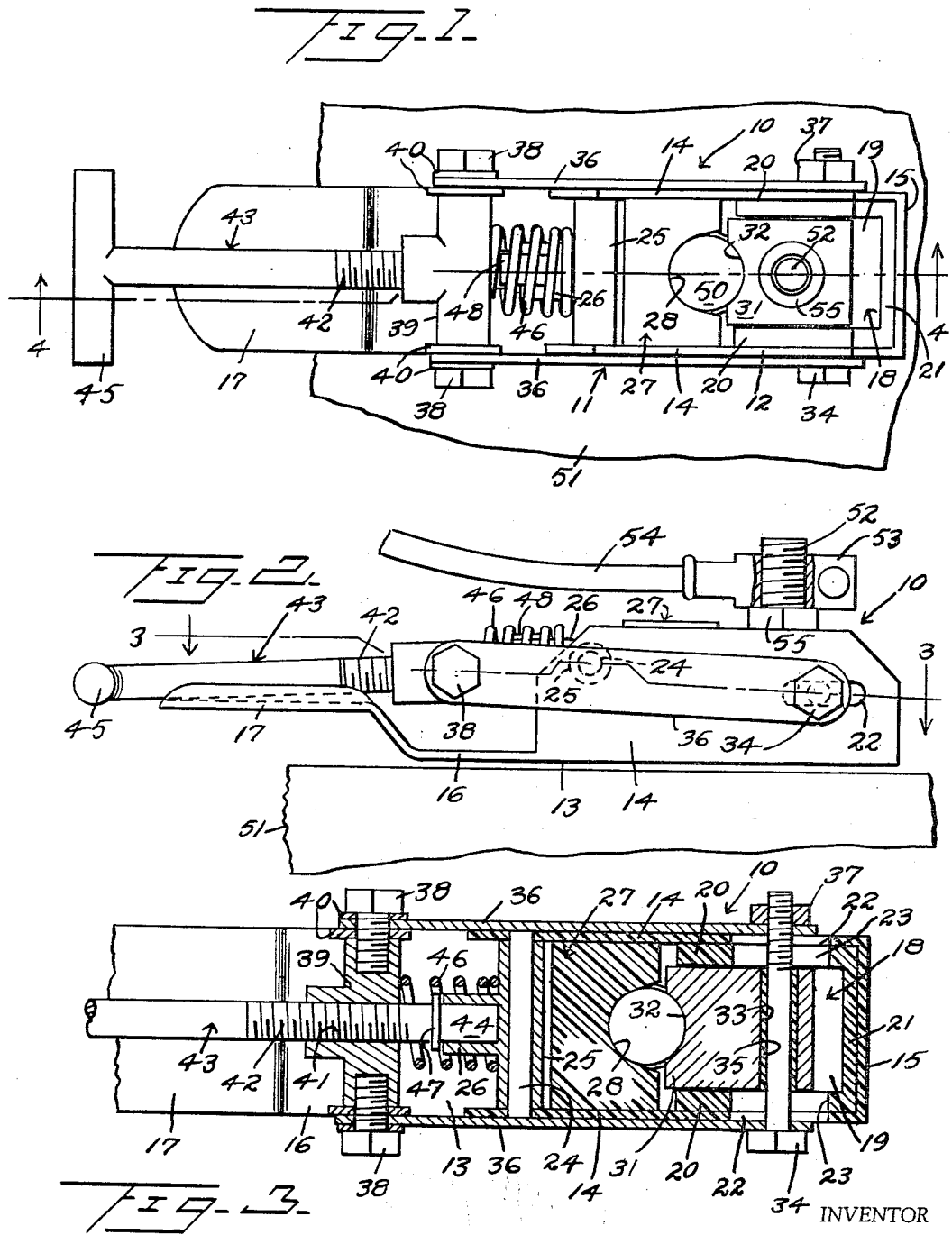

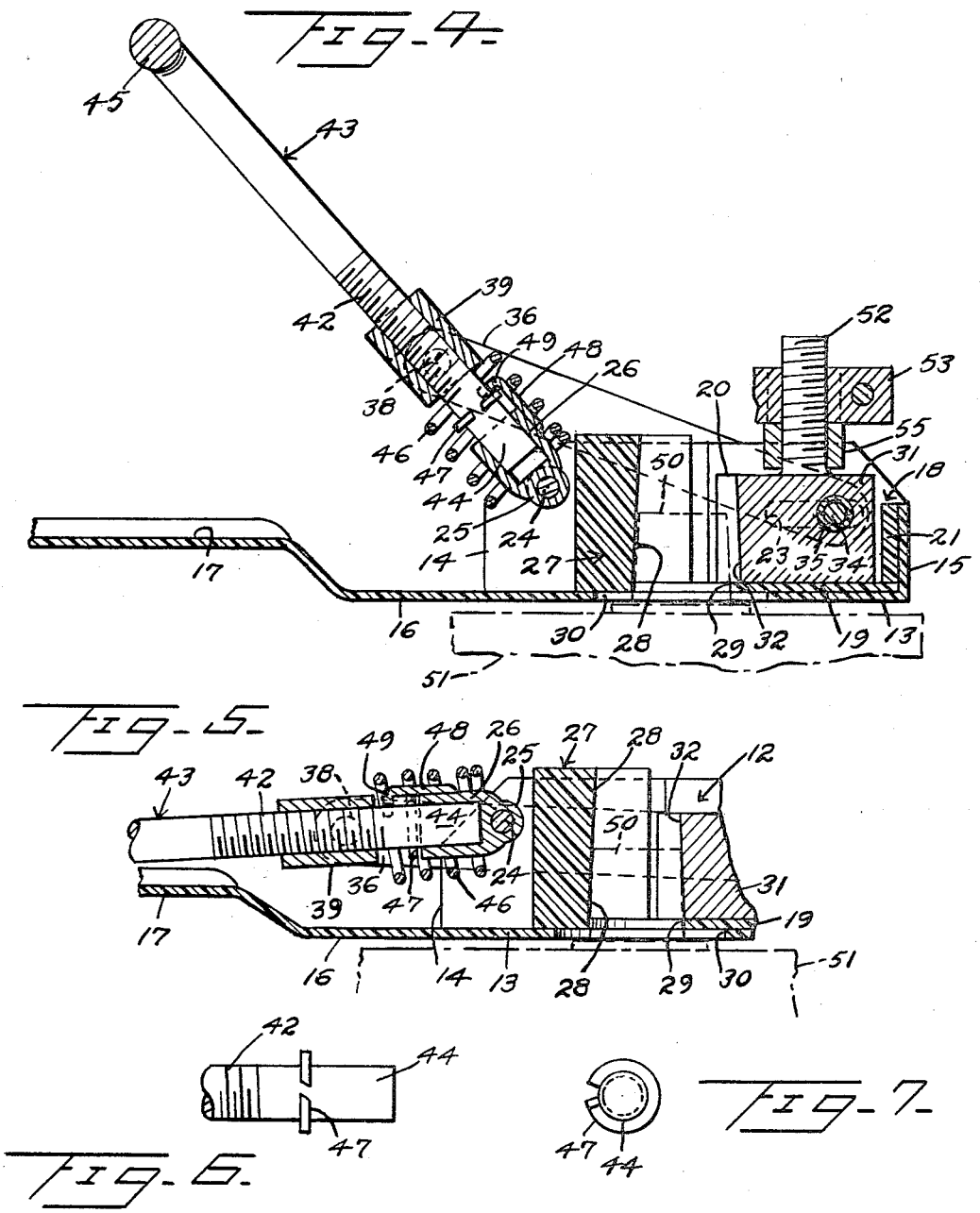

3,324,266
Patented June 6, 1967

3,324,266
CLAMP-ON BATTERY POST SWITCH
Trevenor L. Evans, Box 432, Bloomfield, N. Mex. 87413
Filed Apr. 27, 1965, Ser. No. 451,264
5 Claims. (Cl. 200—153)

This invention relates to a clamp-on switch for a battery post which functions as a battery post to cable connector and also as a switch for breaking the electrical connection between the cable and battery.

It is a primary object of the present invention to provide such a device for use on storage batteries of motor vehicles whereby the electrical system of the vehicle can be quickly and easily disconnected from the vehicle storage battery to eliminate the risk of fire caused by a defect in the electrical system of a motor vehicle when not in use, and which frequently results not only in the loss of the stored vehicles but also of a building in which the vehicle is parked.

A further object of the invention is to provide a device which will enable a battery cable to be readily disconnected from a battery post without the use of tools and without the difficulties frequently encountered due to corrosion of the battery post and cable clamp.

Various other objects and advantages of the invention will hereinafter become more fully apparent from the following description of the drawings, illustrating a presently preferred embodiment thereof, and wherein:

FIGURE 1 is a top plan view of the clamp-on battery post switch;

FIGURE 2 is a side elevational view thereof, partly broken away;

FIGURE 3 is an enlarged fragmentary horizontal sectional view taken substantially along the line 3—3 of FIGURE 2;

FIGURE 4 is an enlarged vertical sectional view taken substantially along the line 4—4 of FIGURE 1, but showing the device adjusted for disconnecting the battery post electrically from the battery cable;

FIGURE 5 is a fragmentary sectional view taken substantially along a line corresponding to FIGURE 4 but showing the device adjusted to electrically connect the battery cable to the battery post;

FIGURE 6 is a fragmentary side elevational view of a part of the device, and

FIGURE 7 is an end elevational view looking from right to left of FIGURE 6.

Referring more specifically to the drawings, the clamp-on battery post switch in its entirety and comprising the invention is designated generally 10 and includes an elongated body 11 having a channel-shaped end portion 12 including a bottom portion 13, side walls 14 and an end wall 15. The side walls 14 extend upwardly from the side edges of the bottom portion 13 and are disposed substantially parallel to one another. End wall 15 extends between corresponding ends of side walls 14. The bottom portion 13 has an extension 16 which projects from the end of the channel portion 12 which is located remote from the end wall 15 and which includes an upwardly offset terminal portion 17 which is preferably transversely bowed so that the upper surface thereof is concave in cross section.

The end of the channel portion 12, located remote from the extension 16, is provided with a liner 18 including a bottom portion 19 which lines a part of the bottom portion 13, sides 20, which line portions of the side walls 14, and an end portion 21 which lines the end wall 15. Side walls 14 and the sides 20 have elongated openings 22 and 23, respectively, which are disposed in registration with one another and which extend longitudinally of the channel portion 12. The liner 18 is formed of an electrical insulating material, preferably a plastic.

As best seen in FIGURE 3, a pin 24 extends across the channel portion 12, remote from end wall 15, and has its ends secured in the side walls 14. A sleeve 25 is journaled on the pin 24 and has a socket 26 secured thereto, intermediate of the ends thereof, and which extends away from the end wall 15. The parts 25 and 26 combine to form a swivel block, the purpose of which will hereinafter become apparent.

A stationary block 27 is secured in the channel portion 12, between said swivel block and the liner 18, and is provided with a vertical recess 28 in the side thereof which faces the wall 15 and which is substantially semicircular. The end of the liner bottom portion 19 which faces the block 27 has a recess 29 of a shape to conform to the recess 28, as seen in FIGURES 4 and 5, and the bottom portion 13 has an opening 30 of a diameter substantially greater than the space between the recesses 28 and 29. The block 27 is formed of an electrical insulating material, preferably a plastic.

A block 31 of an electrical conducting material, such as copper, is mounted for sliding movement in the liner 18 and has an inner end which is provided with an arcuate recess 32 which extends from top to bottom thereof, which is disposed in opposed relation to the recess 28 and which has a radius corresponding to the radius of said recess 28. A bore 33 extends transversely through the block 31 to accommodate a part of the shank of a headed bolt 34 having other portions which are slidably disposed in the openings 22 and 23. The bolt 34 is electrically insulated from the block 31 by a sleeve 35 of electrical insulating material which lines the bore 33.

A pair of rigid links 36 are pivotally mounted adjacent corresponding ends thereof on the bolt 34 and are disposed on outer sides of the walls 14 and between the head of said bolt and a nut 37 which engages the other bolt end. Bolts 38 engage loosely through the other ends of the links 36 and threadedly engage in the ends of a crosshead 39 for pivotally connecting said links to the crosshead. The bolts 38 preferably carry washers 40 which straddle the last mentioned ends of the links 36. The crosshead 39, has a transverse threaded bore 41, intermediate of its ends, to threadedly receive a threaded portion 42 of a lever 43. The lever 43 has an inner end 44 which fits slidably and rotatably in the socket 26 and an outer end which is provided with a handle 45. A compression spring 46 is disposed around the socket 26 and has one end bearing against the sleeve 25 and its opposite end bearing against the crosshead 39 for urging the crosshead and lever away from the pin 24 and sleeve 25. A split ring 47 engages frictionally around the lever 43, between the socket 26 and crosshead 39. The socket 26 has an extension 48 which extends toward the crosshead 39 which has an inwardly turned end 49 which is disposed between said socket and the crosshead, as seen in FIGURES 4 and 5. The ring 47 is disposed between said inturned end 49 and the socket 26.

The lever 43 can be turned by its handle 45 for displacing said lever outwardly relative to the crosshead 39 and socket 26, from its position of FIGURE 5, and the lever 43 may then be swung upwardly from its position in FIGURE 2, resting on the extension or abutment 17, to its position in FIGURE 4. The swivel blocks 25, 26 will turn on the pin 24 as the lever 43 and crosshead 39 are swung upwardly to move the links 36 from their positions of FIGURES 1 and 2 to their positions of FIGURE 4. As the links 36 approach their positions of FIGURE 4, they exert a thrust on the block 31 to cause it to slide in the liner 18 away from the block 27 and to its position of FIGURE 4. As the parts approach their positions of FIGURE 4, the spring 46 displaces the crosshead 39 and lever 43 away from the pivot 24. The body 11 may then be positioned on a post 50 of a vehicle storage battery 51. The post 50 will extend upwardly through the opening 30 and will fit snugly between the recess 28 and the recess 29 and spaced from and out of engagement with the recess 32, so that the battery post is electrically insulated from the clamp-on battery post switch 10 by the liner 18 and block 27, when the block 31 is in its retracted position in FIGURE 4.

A post 52 is fixed to and extends upwardly from the block 31 and is also formed of an electrical material, preferably the same material as said block 31. A clamp 53 of a conventional battery cable 54 is secured in a conventional manner to the post 52. A nut or collar 55 may be provided on the post 52, between the block 31 and clamp 53, for holding the clamp and cable above and out of contact with the body 11, as seen in FIGURE 2. With the block 31 in its position in FIGURE 4, it will be seen that said block, the clamp 53 and cable 54, are electrically disconnected from the post 50, so that the electrical system of the vehicle (not shown) to which the cable 54 is connected, is not electrically connected to the battery 51.

The lever 43 can be rotated in a direction to advance it into the socket 26 from its position of FIGURE 4, to force the crosshead 39 away from the pivot 24, so as to hold the parts in their positions of FIGURE 4, to prevent the block 31 from being moved into engagement with the post 50.

The lever 43 can be rotated in the opposite direction to retract it from the socket 26, so that the crosshead 39 will be yieldably held away from the pivot 24 by the spring 46 to permit the parts 43, 39 and 36 to be swung downwardly from their positions of FIGURE 4 to their positions of FIGURES 2 and 5. During this travel, the links 36 and their pivots 38 pass across a dead center as would be represented by an imaginary line running through and extended from the pivots 34 and 24. As the axis of the crosshead 39 and pivot 38 crosses this aforementioned dead center, the spring 46 yields to allow the crosshead 39 and lever 43 to move toward the pivot pin 24 and said spring thereafter displaces the crosshead and lever away from the pin 24 so as to tend to hold the lever 43 in its position in FIGURE 2, and also in its other position in FIGURE 4. Thus, the lever 43 must be retracted, relative to its position of FIGURE 3, in order that said lever can swing to and from its position of FIGURES 2 and 4. The split ring 47 engages the part 49 to limit the extent that the crosshead 39 can be moved away from pivot 24 by spring 46.

Extension 17 forms a stop or abutment which is engaged by the lever 43 to prevent said lever from swinging downwardly past its position of FIGURE 2. The lever 43 may be revolved and advanced inwardly against the bed of the socket 26, in either its positions of FIGURES 2 and 5 or its position of FIGURE 4, for displacing the crosshead away from the pivot 24 so that the lever cannot be swung from its position in FIGURE 4 to its position in FIGURE 2.

As the lever 43 is swung downwardly to its position of FIGURES 2 and 5, the block 31, which forms a switch, is drawn by the links 36 toward the block 27 and into engagement with the post 50, so that the post is clamped between the jaw faces 28 and 32 and an electrical connection is completed between the post 50 and the cable 54 through the conductors 31, 52 and 53.

Thus, the clamp-on battery post switch 10 can make or break the electrical connection between the post 50 and cable 54 without being disconnected from said post or from the cable. In addition, said device can be completely detached from the post 50 when the parts are in their positions of FIGURE 4 without requiring the use of any tool. By positioning the switch 10 as shown in FIGURE 4 when the vehicle is not in use, the possibility of a fire resulting from a short circuit can be eliminated. One of the devices 10 may be used on each of the battery posts or if a single device 10 is employed it is preferably mounted on the positive battery post.

The body 11 is preferably formed of a material which is not a conductor of electricity, such as a plastic, to prevent the accumulation of corrosion thereon.

Various modifications and changes are contemplated and may obviously be resorted to, without departing from the function or scope of the invention as hereinafter defined by the appended claims.

I claim as my invention:

1. A clamp-on battery post switch comprising a body adapted to engage over a post of a vehicle storage battery and including parts of electrical insulating material engaging said post and holding the body against sliding movement relative to the post, a block of electrical conducting material slidably mounted in said body, and having a part adapted to be secured to a battery cable clamp, and link and lever means connected to said block and to the body, said link and lever means being swingably movable relative to the body for slidably moving the block into and out of engagement with the post for making or breaking, respectively, an electrical connection between the post and cable clamp.

2. A clamp-on battery post switch as in claim 1, said link and lever means including a pivot connecting a lever thereof to the body between the ends of a link thereof, and spring means carried by the link and lever means for urging an end of the link, connected to the lever, away from said pivot.

3. A clamp-on battery post switch as in claim 2, and means for adjusting said lever toward and away from said pivot to prevent swinging movement of the link and lever means, in one adjusted position of said last mentioned means, for retaining said block either in engagement or out of engagement with the post.

4. A clamp-on battery post switch as in claim 3, said link swinging across the pivot during movement of the link and lever means for moving said block either into or out of engagement with said post for locking the lever against swinging movement when advanced toward the pivot, and a stop forming a part of said body and disposed to be engaged by the lever when the link and lever means is positioned for holding the block in engagement with the post.

5. A clamp-on battery post switch as in claim 1, said body having a fixed part cooperating with the block for clamping the device to the battery post only when said block is in engagement with the post.

References Cited
UNITED STATES PATENTS 2,918,543  12/1959  Vingin _____ 200—161 X ROBERT K. SCHAEFER, *Primary Examiner.*

H. HOHAUSER, *Assistant Examiner.*